Nov. 28, 1967    A. M. VASH ET AL    3,354,971
EQUAL ARM BALANCE WITH IMPROVED SHEET METAL BEAM
Filed Aug. 8, 1966    2 Sheets-Sheet 1
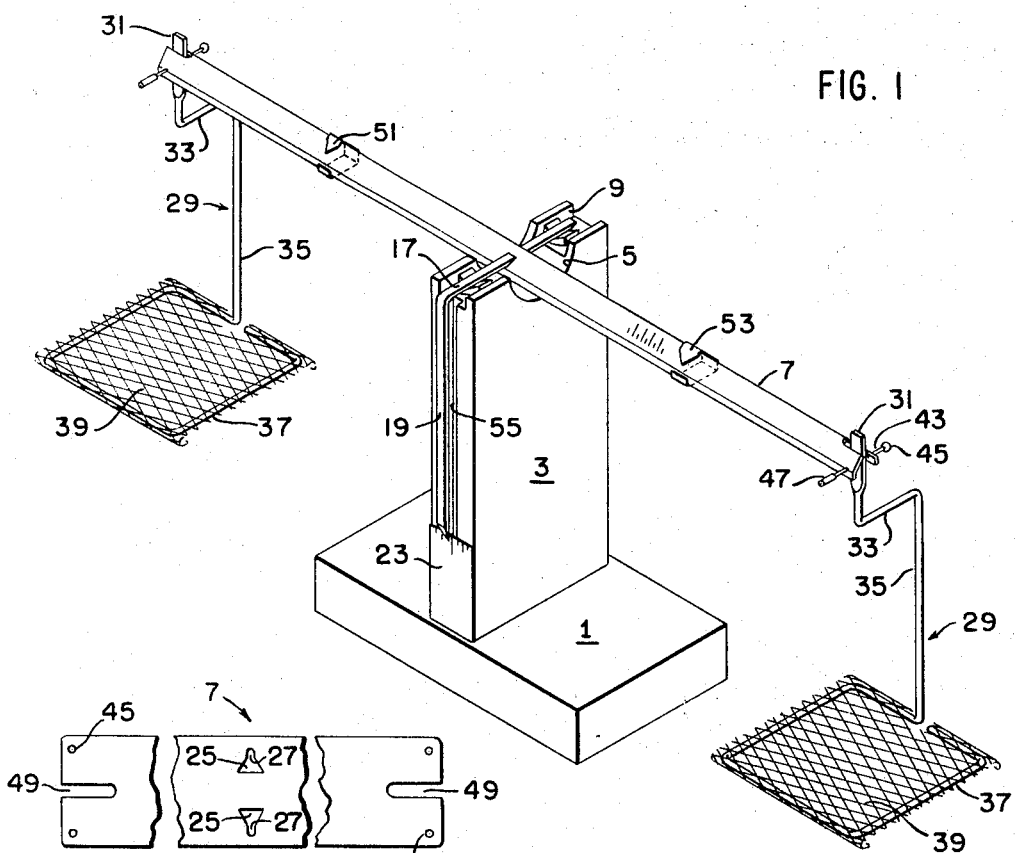
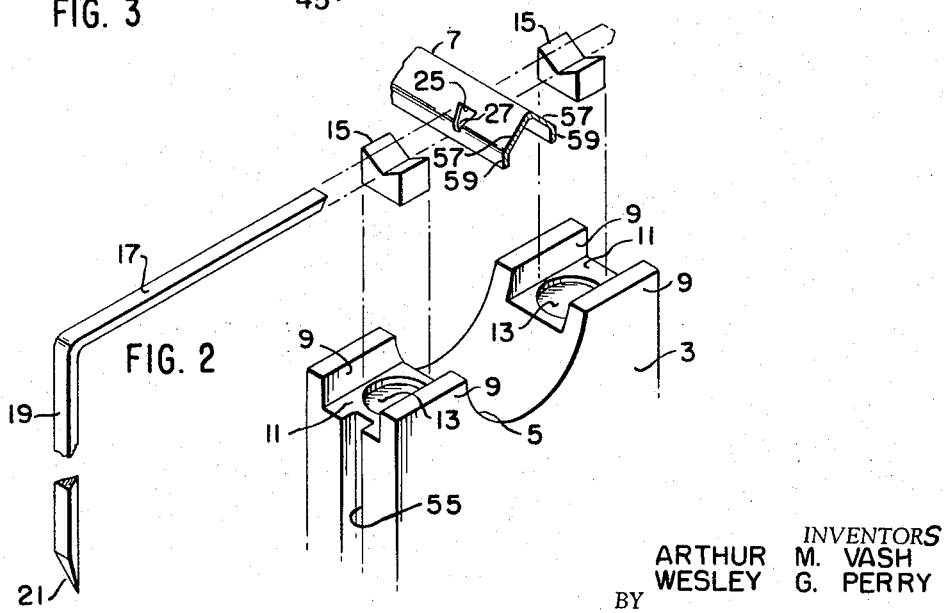
INVENTORS
ARTHUR M. VASH
WESLEY G. PERRY
BY
Kenway, Jenney & Hildreth
ATTORNEYS Nov. 28, 1967      A. M. VASH ET AL      3,354,971
EQUAL ARM BALANCE WITH IMPROVED SHEET METAL BEAM
Filed Aug. 8, 1966                    2 Sheets-Sheet 2
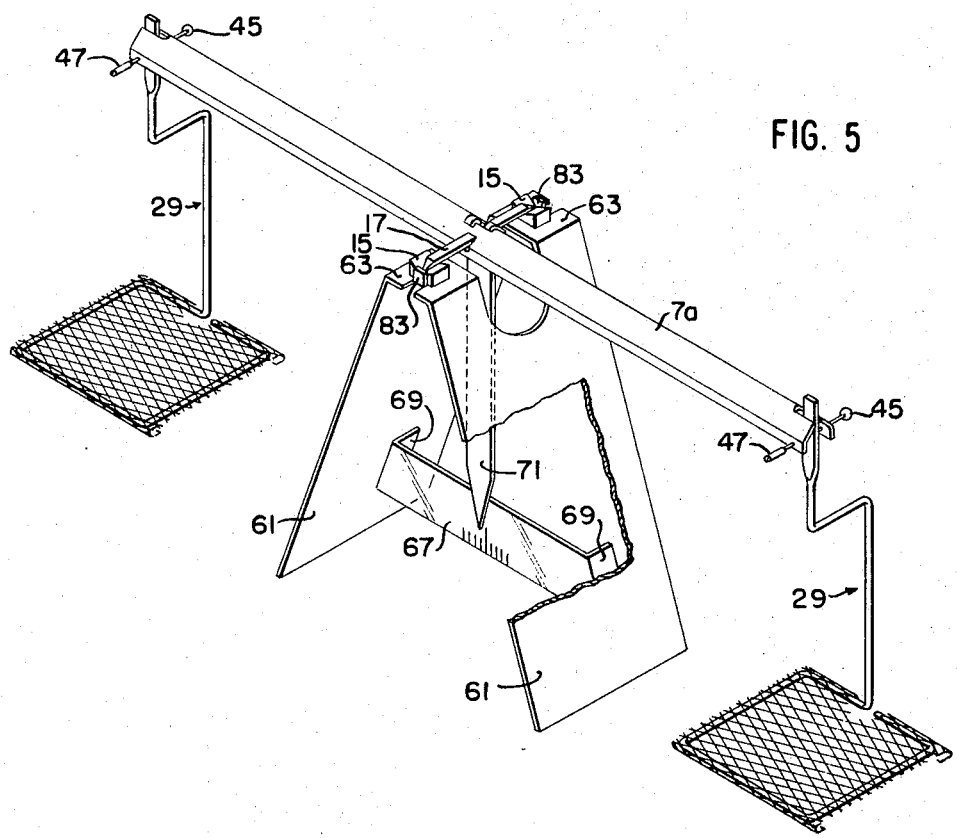
FIG. 5
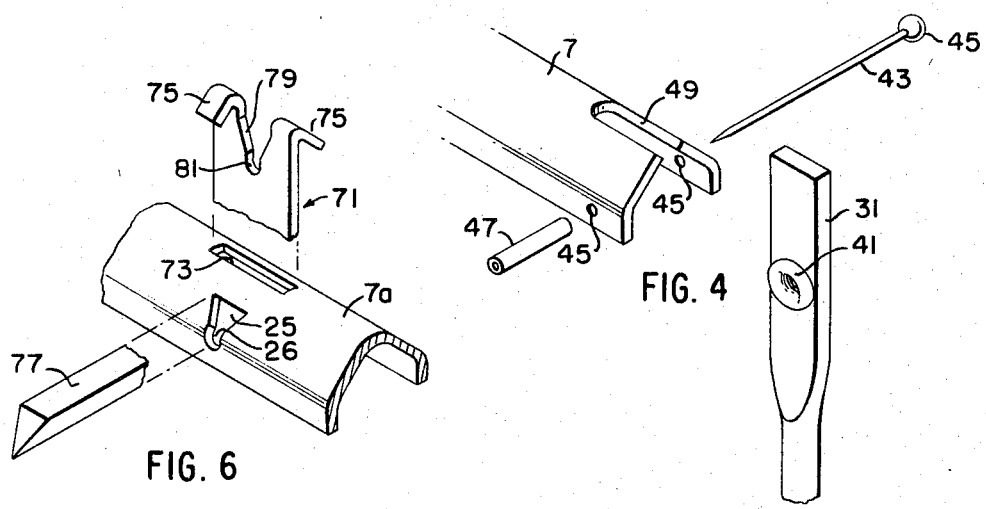
FIG. 6
FIG. 4
INVENTORS
ARTHUR M. VASH
WESLEY G. PERRY
BY
Kenway, Jenney & Hildreth
ATTORNEYS

United States Patent Office 3,354,971
Patented Nov. 28, 1967

3,354,971
EQUAL ARM BALANCE WITH IMPROVED SHEET METAL BEAM
Arthur M. Vash, Newton, and Wesley G. Perry, Wayland, Mass., assignors to Damon Engineering Inc., Needham Heights, Mass., a corporation of Delaware
Filed Aug. 8, 1966, Ser. No. 570,853
6 Claims. (Cl. 177—126)

Our invention relates to balances, and particularly to a novel laboratory balance of simple and reliable construction that is capable of precise and repeatable measurements.

Modern educational methods have led to the teaching of laboratory sciences such as chemistry and physics to a larger number of students at earlier levels than before. A fundamental tool for demonstration and experiment in the teaching of such subjects is a balance of sufficient precision to make meaningful the results of conventional laboratory experiments. In order to increase the efficiency of the educational process, it would be highly desirable to provide as many such balances per class as possible, up to the ideal of assigning a balance to each student. However, the high cost of balances of any degree of precision has made it impractical in many instances to provide more than one balance for a laboratory, particularly at the secondary school levels. In secondary schools, it is difficult to justify high costs for laboratory apparatus, both because of other demands for available funds, and because misuse and damage of apparatus caused by the relative inexperience and youth of the students makes replacement costs too high. Numerous efforts have been made to construct simple and inexpensive balances, but in general these are either so imprecise as to be little more than toys, or they are difficult to use and maintain. For example, attempts have been made to reduce the cost of balances by using wooden beams, such as dowels, yardsticks and the like. Such beams, however, are easily broken and are subject to warping, swelling, checking, shrinking and cracking; thus, they are not ideally suited for long time use in the laboratory or classroom. It is the primary object of our invention to reduce the complexity and cost of reliable precision balances.

Basically, the above and other objects of our invention are attained by a novel equal armed balance, which comprises a set of parts interconnected in a manner that facilitates assembly of the balance. A novel beam is provided that is both strong and light, and yet is of very simple construction. Weighing pans are pivotally suspended from the ends of the beam, and the beam itself is supported by a knife edge engaging a pair of bearing blocks on a support that also carries a scale. A pointer mounted for movement with the balance arm cooperates with the scale to indicate the point of balance. As will appear, the balance arm is made from a single piece of metal, and is so constructed that it can be readily fabricated from sheet stock by a few simple and inexpensive operations. The construction of the balance of our invention will be made clear from the following detailed description, together with the accompanying drawings, of various embodiments thereof.

In the drawings,

FIG. 1 is a schematic orthographic projection of a balance in accordance with a preferred embodiment of our invention;

FIG. 2 is an exploded fragmentary view of a portion of the apparatus of FIG. 1 on an enlarged scale;

FIG. 3 is a plan view of a partially formed beam for use in the apparatus of FIGS. 1 and 2, with parts broken away;

FIG. 4 is a fragmentary schematic exploded view of a portion of the apparatus of FIGS. 1 and 2 on an enlarged scale;

FIG. 5 is a schematic orthographic projection of a modification of our invention; and FIG. 6 is a schematic exploded view of a portion of the apparatus of FIG. 5 on an enlarged scale.

In FIG. 1, we have shown a balance comprising a base 1, preferably of wood or the like. An upright support 3, which may also be of wood or the like, is secured to the base 1 by any suitable means, such as nails, glue or the like. As indicated in FIGS. 1 and 2, the support 3 is provided with a semi-cylindrical recess 5 to admit a balance beam 7 with substantial clearance.

The support 3 is slotted across the top to provide upstanding walls 9 surrounding a pair of ledges 11. In each ledge 11 is formed a cylindrical recess 13 in which a support block 15 may be admitted with slight clearance. The bases of the recesses 13 should be parallel and co-planar.

The blocks 15 are preferably of agate or the like, and are adapted to receive and support a knife edge formed on a transverse bar 17; the blocks being notched for this purpose at an angle more obtuse than the angle formed by the knife edge on the bar 17. Preferably, the upper mutually inclined faces of the blocks 15 do not form a sharp corner, but are slightly rounded at their intersection to provide a smooth supporting surface for the knife edge.

The blocks 15 may simply rest in the recesses 13, and be self-aligning. However, they are preferably pre-aligned by placing a bar across them, and then cemented in place.

The bar 17 may be of steel or other suitable hard material capable of retaining a knife edge. While the bar 17 is preferably of triangular cross-section, as shown, any other convenient polygonal shape may be employed if so desired without departing from the scope of our invention in its broadest aspects.

Preferably, an extension 19 of the bar 17 is formed at right angles to the portion on which the knife edge is formed to serve as a balance indicator. A point 21 on this indicator cooperates with a scale 23 attached to the support 3.

The bar 17 is secured to the beam 7 by passing the bar through transversely aligned, substantially triangular apertures 25 on either side of the beam. The bottom corners of the apertures 25 are relieved, as at 27, to assure that the bar 17 will engage the beam along its sides and that the knife edge itself will be clear. That arrangement reduces the probability of damage to the knife edge when assembling the instrument.

Weighing pans for the balance are formed by rods generally designated at 29 having upper flattened portions 31, arms 33 bent out at right angles from the upright portions 31 to locate the center of gravity of the pan beneath the pivotal axis, to be described; upstanding portions 35 to bring the pans a desired distance below the arm 7; and transversely formed rectangular portions 37 forming a platform support. The platforms are here shown as formed by screens 39, of aluminum or the like, wrapped around the rectangular portions 37 to form supports for weights, pans and the like.

As best shown in FIG. 4, in order to pivot the pans on the arms 7, the upstanding portions 31 of the rods 29 are recessed and provided with eyelets 41 of a suitable metal, such as brass or the like, to serve as bearings for journals comprising pins 43, of steel or the like, preferably provided with conventional beaded ends 45 to facilitate assembling and disassembling the pins 43. Each pin 43 passes through transversely aligned apertures 45 at opposite sides of the arm 7, and may be secured by means of a plastic sleeve 47. Portions of the uprights 31 extend with clearance through guide slots 49 formed at the top of each end of the arm 7. By that arrangement, excessive swaying of the pans about axes normal to the axes of the pivot pins 43, that might bend the pins 43 or cause binding between the rods 29 and the beam 7, is prevented.

Preferably, the beam 7 is provided with a pair of riders 51 and 53, which may be simply formed from flat strips of aluminum or the like bent about the beam and slidable thereon. One of the riders such as 51 may serve to offset the tare weight of a container used in weighing, or to initially set the zero point of the balance. The other rider such as 53 may be used in cooperation with a scale on the arm 7 for precise weighing.

As shown in FIGS. 1 and 2, the support 3 is preferably provided with a vertical slot 55, into which the indicator arm 19 may be placed when it is desired to lock the beam 7 against movement for storage.

FIG. 3 indicates the manner in which the beam 7 may be made from a flat sheet. The apertures 25, the pivot apertures 45 and the slots 49 may be formed by stamping. The beam may then be bent to the generally triangular form shown in FIGS. 1 and 2, and is then completed and ready to receive the pivot pins 43, the knife-edged bar 17, and the riders 51 and 53. The shape of the beam 7 contributes materially to its strength and rigidity, with the upper angular portions 57 providing a broad base for engaging the bar 17, and the depending parallel wall portions 59 contributing to the stiffness of the beam.

When assembled, the operation of the apparatus of FIGS. 1–4 is that characteristic of any laboratory balance of the intermediate precision range. As to precision, with a typical practical embodiment of our invention, with a maximum capacity of 50 grams, a precision of plus or minus 20 milligrams was obtained using a beam 7 about one foot in length and substantially of the proportions shown in FIG. 1.

FIGS. 5 and 6 show a modification of the balance of our invention. In accordance with this embodiment, the base comprises a single sheet of metal, plastic or the like bent or molded to form two inclined supporting sides 61 joined by a pair of horizontal co-planar ledges 63. The upper portions of the supports 61 are recessed as indicated at 65 to admit a beam 7a with substantial clearance. A stiffening bridge for the support 61 is formed by a member 67, preferably of transparent plastic or the like, having angularly disposed end pieces 69 secured to the supports 61 by glue, cement or the like. The scale formed on the member 67 may be illuminted from the rear, if desired, if the member 67 is made of transparent material.

A deflection scale inscribed or drawn on the member 67 cooperates with a pointer 71 secured to the beam 7a, as illustrated in FIG. 6. The member 71 passes up through a slot 73 in the beam 7a, and is formed with oppositely extending ears 75 to grasp the beam 7a.

A bar 77 of triangular cross-section and formed with a knife edge extends through recesses 25 in the beam 7a as in the embodiment of FIGS. 1 and 2. As shown in FIG. 6, the pointer 71 may be formed with a cooperating recess 79 relieved as at 81 to admit the knife edge 77. Preferably, the recess 79 is made small enough to exert some force on the sides of the bar 77 when assembled, to hold the ears 75 on pointer 71 down against the beam 7a.

The support blocks 15 for the knife edge on the bar 77 may rest on, and be cemented to, the ledges 63 forming a part of the support. The support blocks are secured against endwise displacement by means of tabs 83 bent up from the metal of the ledges 63. Preferably, the ends of the bar 77 are shaped to points, as shown in FIGS. 5 and 6, lightly engaging the tabs 83. The tabs 83 thus serve as thrust bearings to prevent lateral movement of the bar 77. Since the point of contact is essentially on the axis of rotation of the beam, any resistance to rotation introduced by these thrust bearings acts at a very small radius and is, therefore, minimal.

The pans 29 may be pivotally secured to the ends of the beam 7a in the identical manner described in detail in conjunction with FIGS. 1–4.

While we have described our invention with respect to the details of various illustrative embodiments thereof, many changes and variations will occur to those skilled in the art upon reading our description, and such can obviously be made without departing from the scope of our invention.

Having thus described our invention, what we claim is:

1. A balance, comprising a support, an elongated beam, said beam comprising a sheet of metal having a pair of parallel spaced vertical wall portions joined by mutually inclined upper wall portions intersecting to form an upper apex, a pair of transversely aligned substantially polygonal apertures having downwardly directed apices and located on said inclined upper wall members substantially at the longitudinal centers of gravity of said beam, a pair of spaced bearing blocks mounted on said support and formed with aligned parallel upper bearing surfaces, a bar of polygonal cross-section extending transversely through said polygonal apertures in said beam, said bar having in cross-section a downwardly directed apex forming a knife edge engaging said parallel bearing surfaces to form a fulcrum for said beam, and a pair of pans pivotally suspended from opposed ends of said beam for rotation about axes parallel to said knife edge.

2. The apparatus of claim 1, in which said polygonal apertures are enlarged in the vicinity of said lower apices to receive said knife edge with clearance.

3. The apparatus of claim 1, in which said triangular bar further comprises an extension bent downwardly at right angles to said knife edge, and a reference index is provided on said support to register with said extension when said beam is in balance.

4. In a balance, a beam comprising a sheet of metal having a pair of spaced parallel wall portions joined by mutually inclined wall portions intersecting to form an apex, a pair of transversely aligned substantially triangular apertures formed in said mutually inclined wall members substantially at the longitudinal center of gravity of said beams with apices directed toward said parallel wall members and away from each other, said apertures being enlarged at said apices to admit one edge of a triangular bar extending through said apertures with clearance, transversely aligned pairs of support apertures at each end of said beam formed in opposed parallel wall members to receive and support pivot pins, and notches in the apex portion of said beam at the ends thereof to guide elements pivoted on pins carried in said support apertures and extending through said notches for motion substantially limited to rotation about the axes of the pins.

5. In a balance, a beam comprising a sheet of metal having a pair of parallel spaced wall portions joined by mutually inclined wall portions intersecting along a longitudinal centerline of the beam, and a pair of transversely aligned substantially polygonal apertures having apices directed away from each other formed on said mutually inclined wall portions substantially at the longitudinal center of gravity of the beam.

6. The apparatus of claim 5, further comprising transversely aligned pairs of support apertures at each end said beam formed in said parallel wall members to receive and support pivot pins, and notches in the ends of said beam along said longitudinal center line to guide elements pivoted on pins carried in said support apertures and extending through said notches for motion substantially limited to rotation about the axes of the pins.

References Cited

UNITED STATES PATENTS

| 920,663 | 6/1909 | Heusser | 177—197 X |
| 1,015,739 | 1/1912 | Maine | 177—126 |
| 1,259,181 | 3/1918 | White | 177—252 X |
| 2,582,017 | 1/1952 | Eagle | 177—197 |

ROBERT S. WARD, JR., *Primary Examiner.*